H. WELCH.
Car-Starter.

No. 214,070.  Patented April 8, 1879.

WITNESSES
Nat. E. Oliphant
Geo. B. Porter

INVENTOR,
Hilyard Welch,
per Chas. H. Fowler,
Attorney.

UNITED STATES PATENT OFFICE.

HILYARD WELCH, OF SCHUYLERVILLE, NEW YORK.

IMPROVEMENT IN CAR-STARTERS.

Specification forming part of Letters Patent No. 214,070, dated April 8, 1879; application filed February 19, 1879.

*To all whom it may concern:*

Be it known that I, HILYARD WELCH, of Schuylerville, in the county of Saratoga and State of New York, have invented a new and valuable Improvement in Street-Car Starters; and I do hereby declare that the following is a full, clear, and exact description of the construction and operation of the same, reference being had to the annexed drawings, making a part of this specification, and to the letters and figures of reference marked thereon.

Figure 1:
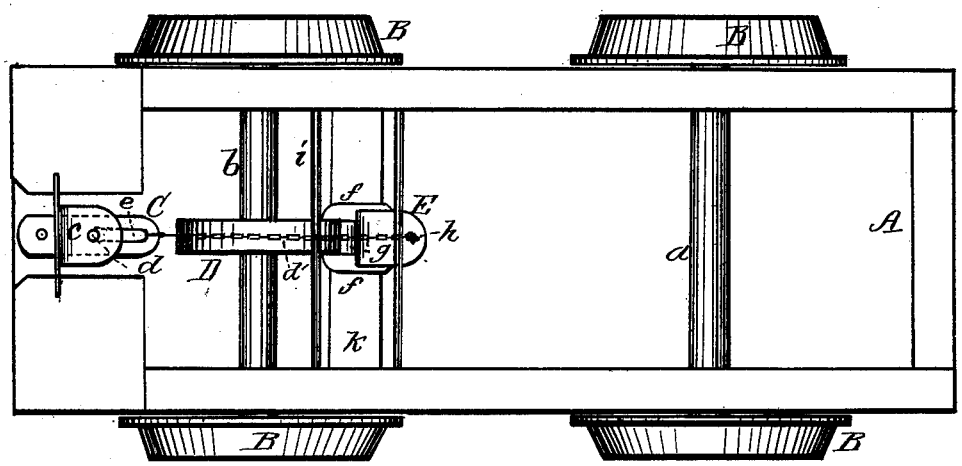
Figure 2:
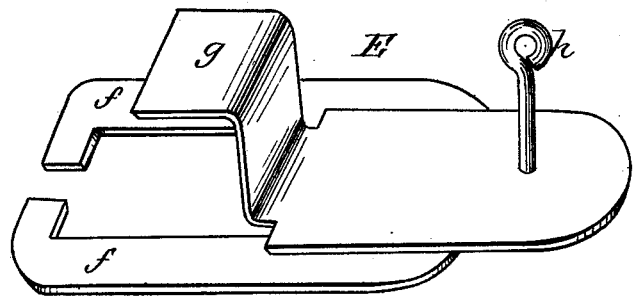

Figure 1 of the drawings is a representation of a top-plan view of a car truck or frame, showing my invention. Fig. 2 is a perspective view of the clutch.

This invention has relation to street-car starters; and the object thereof is to provide a simple and effective device for starting street or horse cars, and one that will require less power to operate it, and which, having no ratchet-wheels or other complicated mechanism, can be applied, with little expense, to the car, and the successful operation of which will be at all times assured.

The invention consists in the peculiar construction of the device, as will be hereinafter described, and subsequently pointed out in the claim.

In the accompanying drawings, A represents the truck or platform of a car, which may be of any suitable construction, and of wood, metal, or other material. The truck or frame A has the usual axles $a$ $b$, upon the outer end of which are rigidly secured suitable wheels B, of the ordinary construction.

To the front end of the truck or frame A is secured a plate, $c$, having a suitable hole or opening, $d$, which is on a line with or registers with an elongated opening, $e$, in a draft-bar, C.

Although I have described this form of draft-bar and the plate $c$, I do not wish to be understood as confining myself to the above construction of devices, as they may be variously changed or modified, as circumstances may require.

To the axle $b$ is rigidly secured a wheel or drum, D, having an annular flange upon both its sides or faces, the purpose of which will be hereinafter described.

Connected to the draft-bar C by chain $d'$, or any other suitable means of connection, is a clutch, E. This "clutch," as it is preferably called, is of metal, and consists of the hooked arms $f$ and curved plate $g$, said clutch having a rod, $h$, for attaching the chain $d'$; or any other suitable device may be used for fastening the end of the chain. The chain $d'$ is prevented from bearing on the rim or periphery of the wheel or drum D by the rod $i$, over which it passes.

The operation of the starter is very simple, and will be readily understood from the following explanation:

The car being at rest, and it being desirous of starting it, the driver slacks his team, which forces back the draft-bar C; or the draft-bar may be caused to move back by any suitable means. At this movement the chain $d'$ is slackened between its connections, allowing the clutch to drop of its own weight and rest upon a support, $k$, secured to the truck or frame A below the axle $b$. The driver now having the car in a position to start, the draft-bar C is pulled forward by the team, which movement, through the agency of the chain $d'$, elevates the clutch E, the hooked ends of the arms $f$ upon the flanges of the wheel or drum D holding the clutch engaged with the same. As the clutch is thus raised the edge of the plate $g$ presses against the periphery of the drum, and by drawing upon the draft-bar the drum is caused to partially rotate.

As the drum is rigidly secured to the axle $b$ the movement of the axle will, of course, in the same ratio move the axle and wheels B, which effectually starts the car with comparatively little effort upon the part of the team; and the devices used for starting the car are so very simple that they can be connected to any of the street-cars now is use at a trifling expense, and not only is the clutch less liable to get out of order than the ratchet, but is adjustable at any point.

Having now fully described my invention, what I claim as new, and desire to secure by Letters Patent, is—

In a street-car starter, the truck or platform A, provided with the usual axles $a$ $b$ and wheels B, said axle $b$ formed with or having rigidly secured thereto the flanged drum D, in combination with the clutch E, having the hooked arms $f$ and plate $g$, the clutch being connected to the draft-bar of the car by a suitable chain, $d'$, substantially as and for the purpose set forth.

In testimony that I claim the above I have hereunto subscribed my name in the presence of two witnesses.

HILYARD WELCH.

Witnesses:
 MAYO P. JAQUITH,
 STEPHEN POTTER.